June 18, 1957      I. R. RINKEWICH      2,796,273
FRICTION SLIDING ROLLER DEVICE
Filed Nov. 22, 1954      2 Sheets-Sheet 2
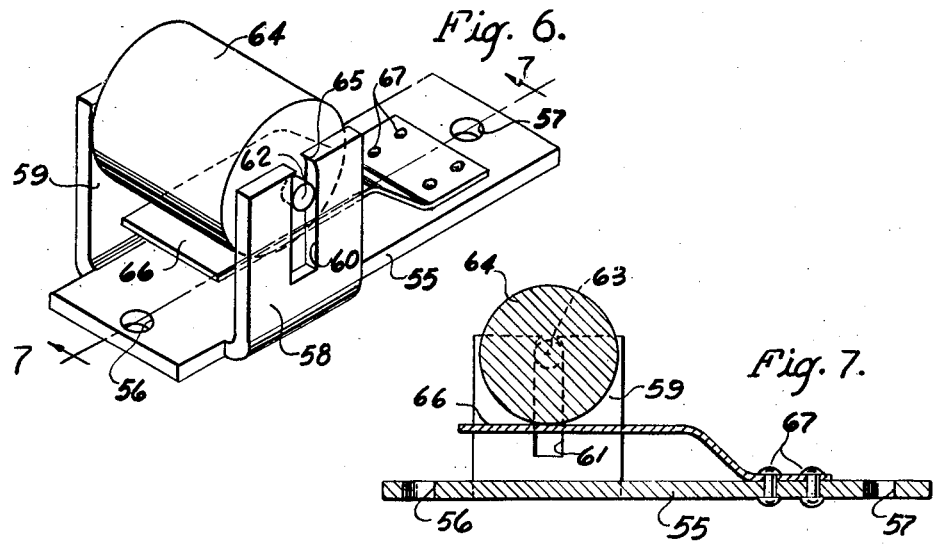
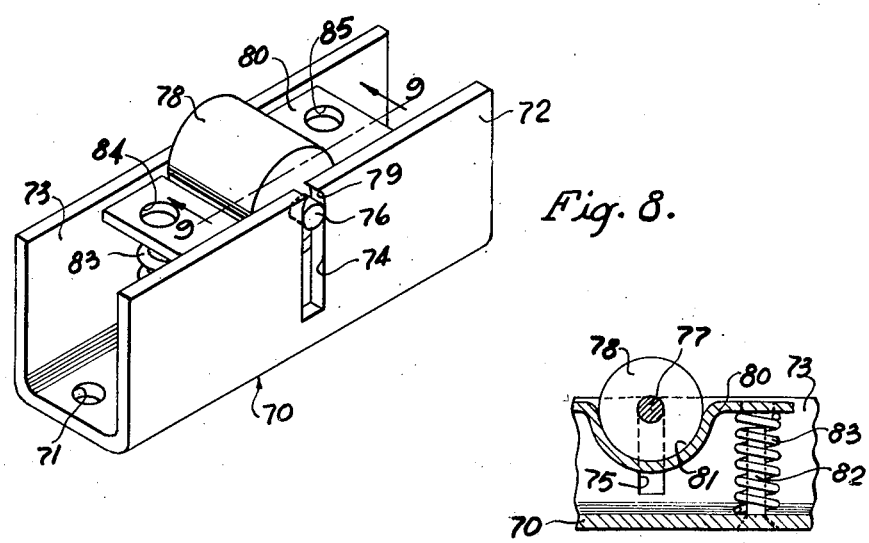
INVENTOR.
ISAAC R. RINKEWICH
BY
L. S. Saulsbury
ATTORNEY

United States Patent Office 2,796,273
Patented June 18, 1957

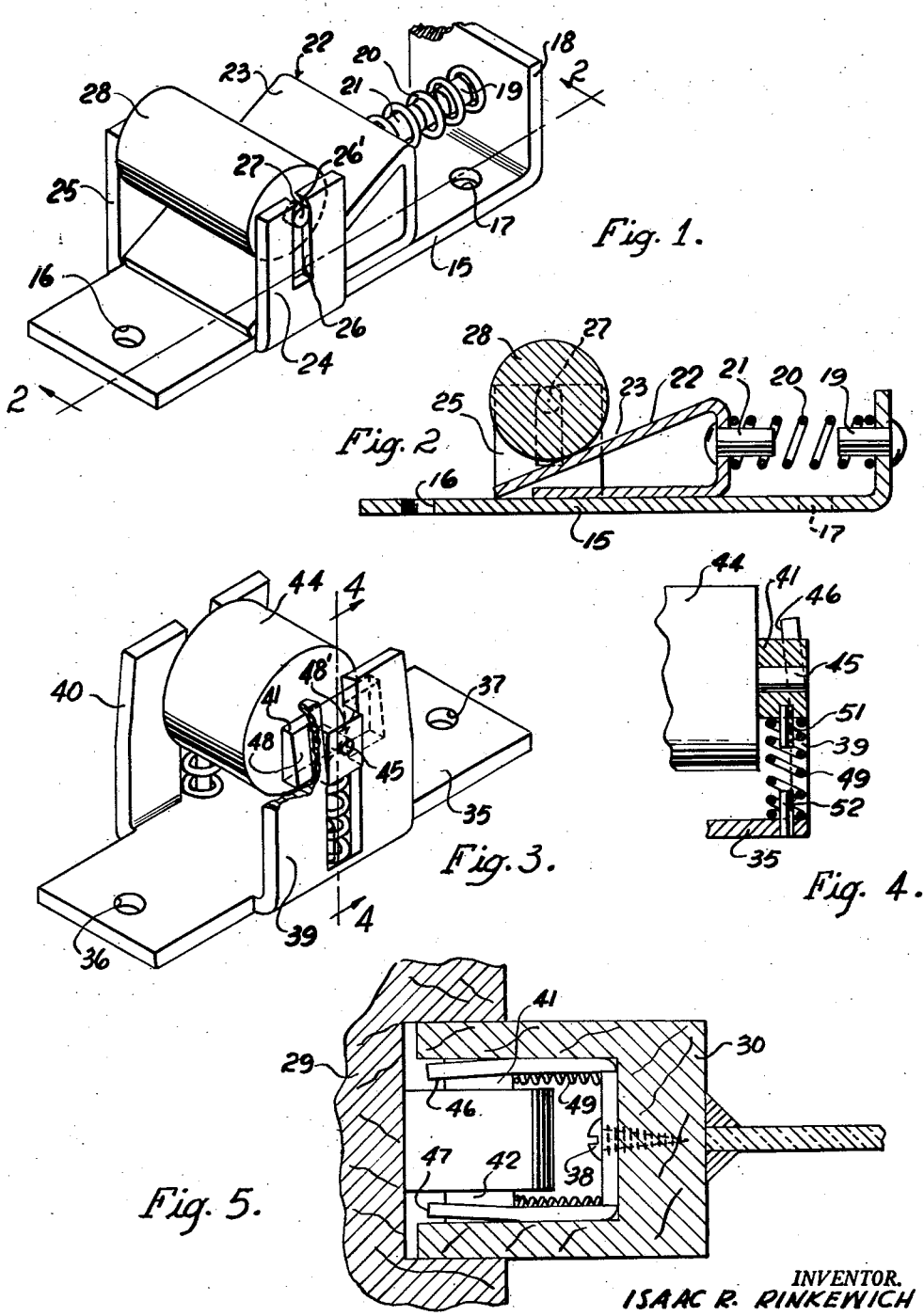

2,796,273

FRICTION SLIDING ROLLER DEVICE

Isaac R. Rinkewich, New York, N. Y.

Application November 22, 1954, Serial No. 470,218

2 Claims. (Cl. 292—75)

This invention relates to a friction sliding roller device.

It is an object of the present invention to provide a friction sliding roller device adapted for holding one member to which it is attached in its adjusted position upon the other member wherein the roller element of the device operating in the guideway of the other member is retarded in rotation by elements which engage the rolling element in such a manner as to frictionally resist its rotation.

It is another object of the invention to provide a friction sliding roller device that is particularly suitable for use in windows to hold the window element in its adjusted or elevated position in the window frame and eliminate thereby the need for window weights.

It is still another object of the invention to provide a friction sliding roller device that will apply friction of the member carrying the device upon the other member, while at the same time permitting the movement of one member relative to the other without too much effort and yet be nearly as effective as the positive locking devices used heretofore.

Other objects of the invention are to provide a friction sliding roller device having the above objects in mind which is of simple construction, inexpensive to manufacture, has a minimum number of parts, compact, durable, free of wear, effective and efficient in use.

For other objects and a better understanding of the invention, reference may be had to the following detailed description taken in connection with the accompanying drawing, in which:

Figure 1 is a fragmentary perspective view of one form of the invention wherein the frictional resistance is applied by a spring pressed wedge element;

Fig. 2 is a longitudinal sectional view taken on line 2—2 of Fig. 1;

Fig. 3 is a fragmentary perspective view of another of the forms of the invention wherein the friction is applied to the contact roller at the ends thereof;

Fig. 4 is a fragmentary sectional view taken on line 4—4 of Fig. 3;

Fig. 5 is a transverse sectional view showing the form of the invention in Figs. 3 and 4 installed in a window assembly;

Fig. 6 is a perspective view of still another form of the invention wherein the rolling element is contacted by the spring element upon its contact face to retard its rotation;

Fig 7 is a longitudinal sectional view taken on line 7—7 of Fig. 6;

Fig. 8 is a perspective view of a still further form of the invention wherein the friction resisting plate is dished to engage half of the surface of the rolling contact at one time and to thereby increase the amount of frictional resistance to the rotation of the rotating contact element;

Fig. 9 is a fragmentary sectional view of this further form of the invention as viewed on line 9—9 of Fig. 8.

Referring now particularly to Figs. 1 and 2, 15 represents a base attaching plate having holes 16 and 17 through which screws are extended to fix the device to a moving member such as a window element as shown in Fig. 5. This base plate 15 is turned up at one end to provide a spring stop portion 18 having a pin 19 for supporting one end of a compression spring 20. The other end of the compression spring is supported on a pin 21 secured to a wedge slide member 22 having an inclined friction surface 23. The wedge member 22 is struck or bent from sheet metal and is slidable over the top surface of the attaching plate 15. The wedge member is so bent and formed that the surface 23 will yield to give additional frictional contact with the roller.

Extending up from the sides of the plate 15 are guide projections 24 and 25, each of which is slotted as indicated at 26 to receive axle projections 27 of a contact roller 28 that rolls in the guideway of the window frame assembly 29, Fig. 5, upon movement of the window element 30. The upper ends of the slots 26 are partially closed as indicated at 26' to prevent the outward displacement of the roller 28.

The spring 20 urges the wedge member 22 against the roller 28 so that the inclined friction surface 23 engages the surface of the roller 28 to give maximum frictional retardation to the rotation of the roller 28, yet permit some rotation and movement of the window element 30 in the frame assembly 29.

Referring now particularly to Figs. 3, 4 and 5, there is shown another form of the invention wherein the friction is applied to the ends of the contact roller to retard its rotation. An attaching plate 35 is provided with openings 36 and 37 through which screws 38 are extended to fix the device to the window element 30. This attaching plate 35 has turned up side projections 39 and 40 that respectively receive friction brake blocks 41 and 42. These brake blocks respectively bear against the ends of a contact roller 44 and are carried respectively on axle projections 45 extending from the respective ends of the roller. The slotted projections 39 and 40 are bent inwardly at their upper ends as respectively indicated at 46 and 47 to force the brake blocks toward the end surfaces of the roller 44. These bent ends have engagement with inclined outer faces 48 of each block so that upon the brake block being urged upwardly by a spring 49, the block is urged inwardly against the end face of the roller and the same time the roller is forced outwardly against the window frame. Each brake block has a guide projection 48' that runs in the slot and the compression spring 49 lies partly in the slot and engages the underside of the brake block. The upper end of the compression spring 49 is held against lateral displacement upon the block by a depending spring guide pin 51. A spring guide pin 52 extends upwardly from the base plate 35 to hold the lower end of the spring 49. It will thus now be seen that with the compression springs 49 acting upon the brake blocks 41 and 42 there is constant frictional resistance applied to the contact roller 44 at all times. The compression springs also serve to force the contact roller outwardly for engagement with the surface of the window frame assembly 28. In this manner, retardation rotation of the contact roller 44 is made.

Referring now particularly to Figs. 6 and 7, there is shown a simplified form of the invention wherein the spring urging the roller into contact with the window frame assembly is applied to the roller to engage the surface thereof and to retard its rotation. A base attaching plate 55 has holes 56 and 57 through which screws 38 extend to secure the device to the window element. The plate 55 has upwardly-extending side projections 58 and 59 having respectively vertical slots 60 and 61 into which extend axle projections 62 and 63 of a contact roller 64. The upper ends of the slots are partially closed as indicated at 65 to prevent the displacement of the roller 64 from the slots.

Beneath the roller 64 is a wide flat spring 66 that is secured at one end to the surface of the attaching plate 55 by a plurality of rivets 67. The width of this spring is substantially the width of the roller so that maximum frictional contact is had with the roller. The spring not only urges the roller outwardly for engagement with the surface of the window frame assembly but also applies frictional resistance to the rotation of the roller.

Referring now to Figs. 8 and 9, there is shown a still further form of the invention wherein greater frictional surface to retard the rotation of the roller is had than with the other forms of the invention. A channel-shaped base member 70 has openings 71 through which screws are extended to attach the device to the window element. The base member 70 has upstanding parallel flanges 72 and 73 which respectively have vertical slots 74 and 75 into which axle extensions 76 and 77 of a contact roller 78 extend. The slots 74 and 75 are partially closed at their upper ends as indicated at 79 to hold the roller 78 against outward displacement from the base member 70. Under the roller 78 and pressing outwardly thereon is a friction plate 80 having a curved retarding surface 81 for engagement with the undersurface of the roller 78.

Projecting upwardly from the bottom of the attaching member 70 are longitudinally-spaced spring guides 82 on which are disposed compression springs 83. The opposite ends of the friction plate 80 has openings 84 and 85 through which the projections 82 are projected upon the roller 78 forcing the plate 80 into the channel against the action of the compression springs 83.

The curved retarding surface 81 of the friction plate surrounds substantially half the circumference of the roller 78 and accordingly will have heavy frictional resistance to the rotation of the roller 78. The rollers are preferably made of "nylon" to have quiet and good wearing qualities.

It should now be apparent that there has been provided a friction sliding roller device for holding one member relative to the other without too much effort.

While various changes may be made in the detail construction, it shall be understood that such changes shall be within the spirit and scope of the present invention as defined by the appended claims.

What is claimed is:

1. A friction sliding roller device comprising an attaching base member, laterally spaced side projections extending upwardly from the attaching base member, said projections having vertically extending slots, a contact roller having axle projections extending respectively into the respective slots, a wedge member slidable upon said attaching base underneath the contact roller, said wedge member having an inclined surface engageable with the surface of the contact roller to retard its rotation, spring-biasing means for urging said wedge member toward said contact roller and means for preventing the displacement of the roller from said slots.

2. A friction sliding roller device as defined in claim 1, and said attaching member having a turned up end and said spring-biasing means reacting between the turned up end and said wedge member.

References Cited in the file of this patent
UNITED STATES PATENTS

| | | |
|---|---|---|
| 642,872 | Owens | Feb. 6, 1900 |
| 2,030,269 | Roche | Feb. 11, 1936 |
| 2,247,618 | Moroney | July 1, 1941 |
| 2,439,057 | Russell | Apr. 6, 1948 |